United States Patent
Walter et al.

(10) Patent No.: US 7,142,744 B2
(45) Date of Patent: Nov. 28, 2006

(54) WAVELENGTH POWER EQUALIZATION BY ATTENUATION IN AN OPTICAL SWITCH

(75) Inventors: Tony Walter, San Jose, CA (US); Dan Blumenthal, Santa Barbara, CA (US); John E. Bowers, Santa Barbara, CA (US); Peter Hunt, Scotts Valley, CA (US); Roger J. Helkey, Montecito, CA (US); Xuezhe Zheng, Goleta, CA (US)

(73) Assignee: Calient Networks, San Jose, CA (US)

( * ) Notice: Subject to any disclaimer, the term of this patent is extended or adjusted under 35 U.S.C. 154(b) by 0 days.

(21) Appl. No.: 11/067,030

(22) Filed: Feb. 24, 2005

(65) Prior Publication Data

US 2005/0152637 A1    Jul. 14, 2005

Related U.S. Application Data

(60) Continuation of application No. 10/732,968, filed on Dec. 10, 2003, now abandoned, which is a division of application No. 09/855,765, filed on May 14, 2001, now Pat. No. 6,697,547.

(51) Int. Cl.
    *G02B 6/35* (2006.01)
    *G02B 6/00* (2006.01)
(52) U.S. Cl. ........................ 385/18; 385/16; 385/140
(58) Field of Classification Search ............. 385/16–23
    See application file for complete search history.

(56) References Cited

U.S. PATENT DOCUMENTS

| | | | |
|---|---|---|---|
| 5,745,271 A | 4/1998 | Ford et al. | |
| 5,900,983 A | 5/1999 | Ford et al. | |
| 6,222,954 B1 | 4/2001 | Riza | |
| 6,456,751 B1 * | 9/2002 | Bowers et al. | 385/16 |
| 6,525,863 B1 * | 2/2003 | Riza | 359/290 |
| 6,625,340 B1 | 9/2003 | Sparks et al. | |
| 6,697,547 B1 | 2/2004 | Walter et al. | |

OTHER PUBLICATIONS

Hiroshi Toshiyoshi and Hiroyuki Fujita, "Electrostatic Micro Torsion Mirrors for an Optical Switch Matrix", 1996 IEEE, Journal of Microelectromechanical Systems, vol. 5, No. 4, p. 231-7.

* cited by examiner

*Primary Examiner*—Michelle Connelly-Cushwa
(74) *Attorney, Agent, or Firm*—Beyer Weaver & Thomas LLP (57) ABSTRACT

A method for equalizing optical signal power in a group of optical signals transmitted through an optical switch in an optical transmission system. In one embodiment a group of optical signals is input into an optical switch having at least one movable mirror array with a plurality of reflectors formed thereon, the optical beam being directed onto a selected at least one reflector and wherein attenuating the optical beam is accomplished by controllably detuning at least one of the selected at least one reflector to attenuate the optical beam.

7 Claims, 10 Drawing Sheets

WAVELENGTH POWER EQUALIZATION BY ATTENUATION IN AN OPTICAL SWITCH

RELATED APPLICATION

The invention described herein is a continuation application of a divisional application Ser. No. 10/732,968 filed Dec. 10, 2003 now abandoned claiming priority from the U.S. patent application Ser. No. 09/855,765, entitled "Wavelength Power Equalization by Attenuation in an Optical Switch", invented by Walter, et al., filed on May 14, 2001 and now issued as U.S. Pat. No. 6,697,547 B2. The aforementioned patent document is hereby incorporated by reference.

TECHNICAL FIELD

The invention described herein relates to methods and apparatus for achieving selective power attenuation in the optical signals passing through optical switches. In particular, such selective attenuation is used to accomplish optical power balancing (or equalization) among the optical signals passing through optical switches. More particularly, the invention relates to power balancing using optical switches of fiber optic transmission systems to attenuate optical power in selected channels of an optical system such that the power distribution of the optical channels falls within some user selected power margin.

BACKGROUND

As is well known, fiber optic technology is a rapidly growing field with vastly expanding commercial applicability. As with all technologies, fiber optic technology is faced with certain practical difficulties. In long haul optical transmission systems, optical signal power loss causes unpredictable but significant losses in signal strength. Such losses are caused by a variety of factors, including but not limited to, variations in optical path length, equipment characteristics, environmental conditions, the effects of aging, and so on. In view of these and other factors, it has proven difficult to maintain optical signals at relatively uniform power levels as they pass through the optical transmission system. This is particularly so as the optical signals pass through the optical switches of an optical transmission system.

Another factor which contributes to the development of non-uniform signal power in a group of many optical signal channels is related to the need for continuing signal amplification of the optical signals as they negotiate an optical path through an optical transmission system. Optical amplification is required to avoid expensive electrical signal regeneration over optical paths that can extend over thousands of miles. The chain of amplifiers arranged along an optical path is referred to as a cascade of amplifiers. A problem with such cascades of amplifiers is that optical amplifiers have a strong wavelength dependence on gain. This means that the amplifiers amplify optical signal at some wavelengths more than optical signals at other wavelengths. This and other problems induce non-uniformity in optical signal. More troubling, the effects of amplifier gain non-uniformity increase with each amplifier in the cascade of optical amplifiers along the optical path. This means that as the optical signal passes through each amplifier, the effects of amplifier gain non-uniformity intensify. Therefore, the longer the signal path, the greater the number of amplifiers, and as a result, the greater the degree of gain non-uniformity.

In addition, the buildup of optical noise from the amplifier gain peaks can quickly saturate a cascade of amplifiers.

When groups of optical signals (channels) having non-uniform optical power pass through switching nodes a variety of problems can occur. One problem of particular significance is the possibility of misdirecting light from one optical channel onto another optical channel. As a result, an input signal (or a portion thereof) from one channel is output into the wrong output fiber. Consequently, a signal intended for one output fiber can be contaminated by signal intended for another output fiber. This phenomenon is referred to herein as "cross-talk". This problem is magnified to a distressing level in situations where the optical signal power in one or more fibers is significantly greater than the optical power in other fibers. For example, if a first optical beam is 10 dBm more powerful than an adjacent second optical beam, if even a small fraction of the light from the first beam is deflected into the path of the second beam, the signal of the second beam will be corrupted by the cross-talk from the first beam. Moreover, as optical switch size steadily decreases, the margin for error in switching systems also decreases. As a result, in systems with non-uniform optical power levels in the fibers, the likelihood of cross-talk and the resulting problems significantly increases.

One conventional approach for addressing gain non-uniformity problems is through the use of static gain equalization using commercial filters, such as fiber Bragg gratings. In such implementation, the wavelength dependent loss related to the filters corresponds approximately to the wavelength dependent gain from optical amplifiers. However, optical amplifier gain is affected by other factors, such as, input signal level, temperature, and amplifier aging effects. As a result, simple Bragg gratings do not provide a satisfactory solution to gain non-uniformity problems.

Numerous other approaches toward solving signal non-uniformity in optical network applications have been tried. Although some of these approaches work well enough in some situations, each suffers from its own set of limitations. All require the addition of new hardware which introduces new causes for signal loss in the system. Additional new hardware increases system complexity, thereby increasing unreliability. Moreover, these hardware systems all increase cost. Therefore, there are continuing efforts to provide improved methods and apparatus for reducing the effects of non-uniform optical power in optical transmission systems without adding new hardware, without substantially increasing system complexity and unreliability, and without increasing cost. Method and apparatus embodiments constructed in accordance with the principles of the present invention are intended to solve these and other problems.

SUMMARY OF THE INVENTION

In accordance with the principles of the present invention, an apparatus and method for achieving a more uniform optical power distribution among a group of optical channels by attenuating optical power in the selected optical channels to provide improved signal balancing across the many channels of a group of optical channels is disclosed.

One embodiment comprises a method for equalizing optical signal power in a group of optical signals transmitted through an optical switch in an optical transmission system by inputting a group of optical signals into an optical switch, defining a user selected power range, and attenuating selected optical signals in the group of optical signals such that the signal power of each optical signal in the group of optical signals falls within the user selected power range.

A further embodiment comprises inputting a group of optical signals into an optical switch, monitoring the optical power of the group of optical signals, determining the optical power of the weakest signal of the group of optical signals to define a baseline optical power level which is implemented in combination with a user selected power margin to define a user selected power range into which selected optical signals are attenuated such that the signal power of each optical signal in the group of optical signals falls within the user selected power range.

Further embodiments include embodiments where the user selected power margin is freely adjustable by a system user.

Other embodiments implement user selected power margins of about 2 dBm, 1.5 dBm, 1 dBm, and 0.5 dBm.

Yet another embodiment comprises inputting a group of optical signals into an optical switch which includes at least one movable mirror array having a plurality of reflectors and wherein the group of optical signals is directed onto the reflectors, monitoring the optical power of the group of optical signals, defining a baseline optical power level based on the optical power of the group of optical signals, implementing a user selected power margin in combination with the baseline optical power level to define a user selected power range, and selectively attenuating the optical power of signals which fall outside the user selected power range by controllably detuning selected reflectors to attenuate the selected optical signals such that the signal power of each optical signal in the group of optical signals falls within the user selected power range.

Other aspects and advantages of the invention will become apparent from the following detailed description and accompanying drawings which illustrate, by way of example, the principles of the invention.

BRIEF DESCRIPTION OF THE DRAWINGS

The following detailed description of the embodiments of the invention will be more readily understood in conjunction with the accompanying drawings, in which.

It is to be understood that in the drawings like reference numerals designate like structural elements.

DETAILED DESCRIPTION OF THE DRAWINGS

The present invention has been particularly shown and described with respect to certain preferred embodiments and specific features thereof. The embodiments set forth herein below are to be taken as illustrative rather than limiting. It should be readily apparent to those of ordinary skill in the art that various changes and modifications in form and detail may be made without departing from the spirit and scope of the invention.

The embodiments described below provide methods and apparatus for achieving power balancing using optical switches of fiber optic transmission systems to attenuate optical power in selected channels of an optical system such that the power distribution of the optical channels falls within some chosen power margin.

Figure 1:
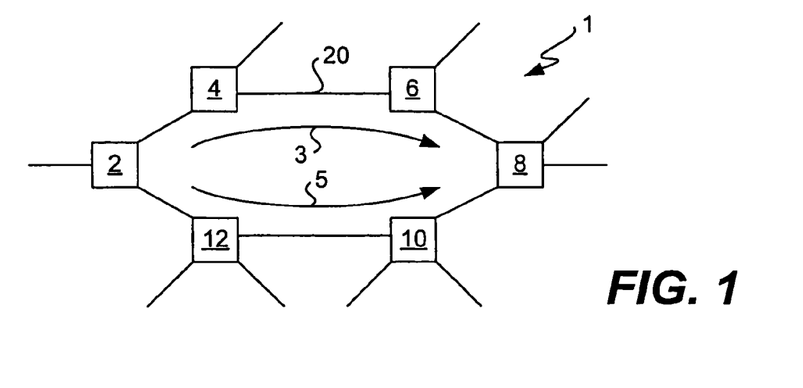
FIG. 1 is a block diagram of optical transmission system of the present invention.

FIG. 1 is a block diagram of an optical transmission system 1 that employs optical cross-connect switches 2, 4, 6, 8, 10, and 12. The optical cross-connect switches 2, 4, 6, 8, 10, and 12 allow the optical transmission system 1 to route data traffic from a variety of different sources to a variety of different target destinations. Each optical cross-connect switch 2, 4, 6, 8, 10, 12 branches to numerous destinations allowing quick and versatile switching to route data traffic to a desired destination. Moreover, such systems 1 recover from failures relatively quickly. For example, if the optical fiber line 20 connecting switches 4 and 6 is accidentally severed, the data carried in optical path 3 cannot reach switch 8. However, in the event of such a failure, the optical cross-connect switch 2 redirects the optical path from path 3 to path 5 avoiding the cut in fiber line 20 enabling the data to reach switch 8.

The optical transmission system 1 can carry digital data, voice signals, and video signals over fiber optic lines at various transmission speeds. The transmission system 1 can send digital information in various formats, for example, in ATM format. Such an optic system 1 can send internet and intranet traffic. The optical transmission network 1 can, for example, use ISDN, DWDM, or WDM technologies to transfer digital information at extremely high capacities.

Figure 2:
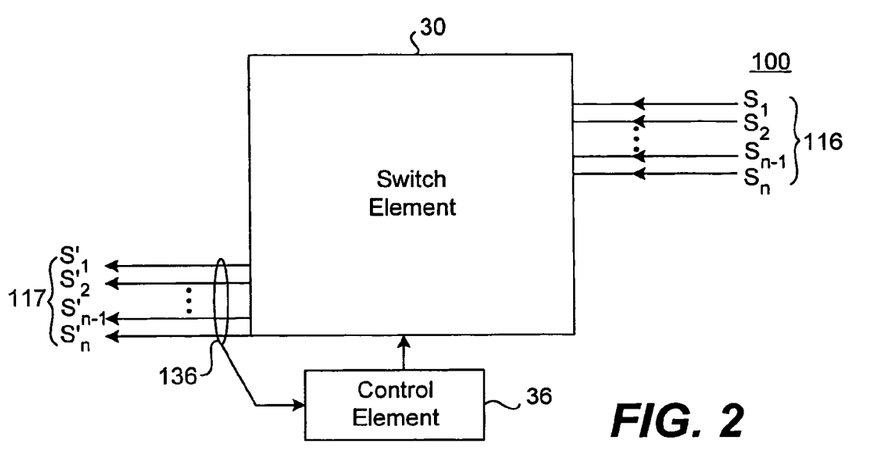
FIG. 2 is a block diagram of an embodiment of an optical cross-connect (switch) of the present invention.

FIG. 2 is a block diagram of an optical cross-connect switch embodiment 100. A plurality of input optical signals (or channels)($S_1, S_2, \ldots, S_{n-1}, S_n$) 116 are input into a switching element 30. The switching element 30 of the switch 100 redirects the input signals as needed and plurality of output optical signals (or channels)($S_1'$, $S_2'$, ..., $S'_{n-1}$, $S_n'$) 117 are output from the switch 100. As they exit the switching element 30 the power level of the output optical signals ($S_1'$, $S_2'$, ..., $S'_{n-1}$, $S_n'$) is detected with optical detector elements 136. Such monitoring is continuous and ongoing as the optical channels are constantly adjusted by the control circuitry of the control element 36. These adjustments reflect, among other things, changes in optical paths, changes in signal power, changes in the operational status in the fibers within the system, as well as a list of other factors. Typically, as each optical signal exits the switching element 30, a detector 136 measures the optical power of the signals, and each optical signal of the group of optical signals ($S_1'$, $S_2'$, ..., $S'_{n-1}$, $S_n'$) is optimized for maximum optical power. As stated previously, optical paths are continuously changing to redirect optical signals to accommodate a variety of system needs. As a result, signal monitoring and signal optimization is conducted at periodic intervals. Moreover, after optimization each signal in the group of optical signals ($S_1'$, $S_2'$, ..., $S'_{n-1}$, $S_n'$) will not have the same optical power as the other signals in the group. Thus, it is common to have a non-uniform optical power distribution in a group of optical signals ($S_1'$, $S_2'$, ..., $S'_{n-1}$, $S_n'$) as it is output from a switch 30.

Figure 3A:
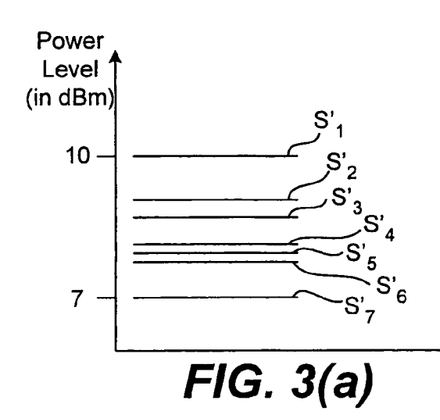
FIGS. 3(a) and 3(b) are graphs depicting optical power in a group of optical channels before and after optical power equalization in accordance with the principles of the present invention.

FIG. 3(*a*) graphically illustrates seven sample optical signals ($S_1'$, $S_2'$, $S_3'$, $S_4'$, $S_5'$, $S_6'$, and $S_7'$) at seven different power levels as they are output from switching element 30. In reality the group of optical signals can include 100's, 1000's, or even more optical signals. The optical power of each output signal ($S_1'$, $S_2'$, $S_3'$, $S_4'$, $S_5'$, $S_6'$, and $S_7'$) is measured by the detectors 136. FIG. 3(*a*) shows a power distribution between the strongest ($S_1'$) and weakest ($S_7'$) signals in the group.

The inventors contemplate that embodiments of the present invention can selectively attenuate the optical power of selected optical signals to achieve a desired degree of power equalization among a group of optical signals. An important aspect of the embodiments is the achievement of an equalized power distribution in a group of optical channels such that each optical channel falls within a user selected power range. Moreover, such achievement of an equalized power distribution in a group of optical channels is accomplished without arbitrarily limiting the output power of any output channel. In achieving this goal there are two parameters which must be considered when implementing aspects of the present invention, desired degree of power equalization (also referred to as power balancing) and optimal signal power. It is desirable to have the greatest possible signal power and also desirable to have the distribution of signal power in the group of optical signals be as small as possible. Thus, the weakest signal (here, $S_7'$) applies a baseline level (lower limit) of optical power in the group of optical signals being attenuated. Of course it is possible to attenuate the signal strength of the group of optical signals to a level below its baseline level, it is just not the most preferred approach.

With continuing reference to FIG. 3(*a*) it can be seen that the optical power of the weakest channel ($S_7'$) is about 7 dBm. Thus, a baseline level is 7 dBm. In perfect signal balancing each of the optical channels ($S'_1$, $S'_2$, $S'_3$, $S'_4$, $S'_5$, $S'_6$ and $S'_7$) are selectively attenuated until they each have a power level of 7 dBm. However, this level of signal balancing is not required, satisfactory optical performance can be achieved by attenuating selected channels such that an "equalized" power distribution is formed wherein the optical power of each channel of the of the group of optical channels falls within some user selected power margin. A preferred power margin is 1 dBm. Other useful power margins include, but are not limited to 2.0 dBm, 1.5 dBm, and 0.5 dBm. The user selected margin and the baseline power define a user selected power range. Thus, in the depicted example, the power levels of each of the optical channels should fall within the user selected power range of between 7 dBm and 8 dBm. However, an important feature of some embodiments of the invention is that the optical power margin can be freely adjusted by the user (such margins can be dictated by network tolerances, the application, etc.). The power margin can be narrower or wider depending on the needs of the system or user. This power margin can be set remotely or locally using whatever criteria the user deems important. Additionally, the power margin can be adjusted depending on system needs based on non-local system requirements (e.g. based on system needs many hundreds of miles away).

Figure 3B:
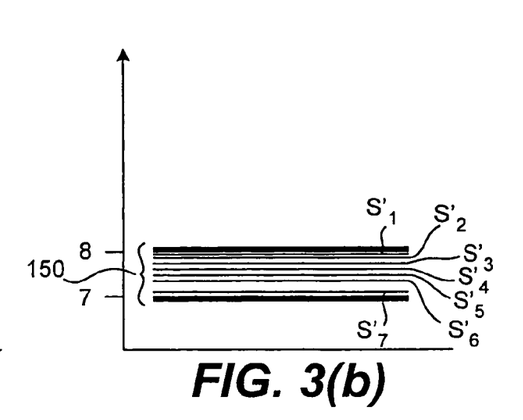

Once the power range is set, each optical channel having a power level falling outside the range is attenuated to a level inside the range. FIG. 3(*b*) shows the group of optical channels ($S'_1$, $S'_2$, $S'_3$, $S'_4$, $S'_5$, $S'_6$ and $S'_7$) after selectively attenuating the optical power in the stronger channels ($S'_1$, $S'_2$, $S'_3$, $S'_4$, $S'_5$, $S'_6$ and $S'_7$) until they all fall within a preferred 1 dBm power margin 150.

Figure 4A:
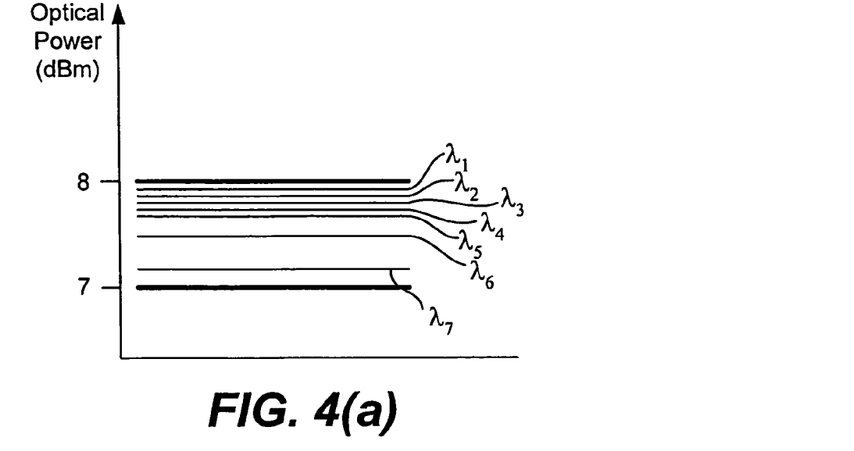
FIGS. 4(a), 4(b), and 5 are graphs depicting optical power in a group of optical channels which are subject to varying power levels during optical power equalization in accordance with the principles of the present invention.
Figure 4B:
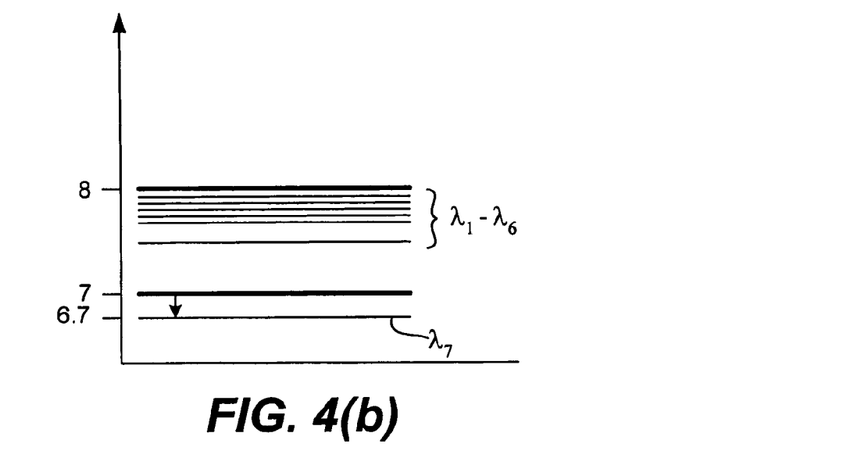
Figure 5:
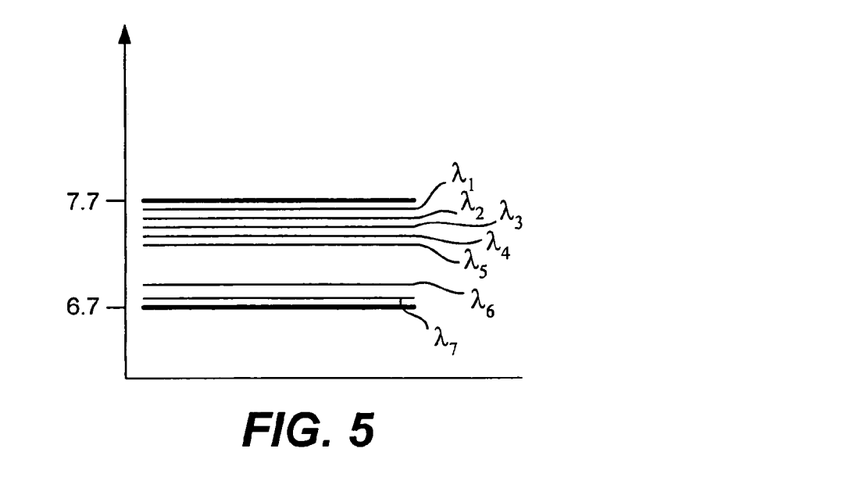

Moreover, the optical power of the channels are maintained within the user selected power margin 150 by periodic monitoring and power optimization/attenuation which forms part of the embodiment. FIGS. 4(*a*), 4(*b*), and 4(*c*) show how embodiments of the invention can adapt to the constant variations in optical power among the group of optical channels. FIG. 4(*a*) shows an "equalized" power distribution similar to that of FIG. 3(*b*). In the example of FIG. 4(*b*), the weakest channel ($S'_7$) undergoes a loss of optical power (shown by the arrow). Consequently, the optical power of channel $S'_7$ falls outside the user selected power margin 150. Such power variations are common in optical systems and arise from a wide range of sources. For example. in the depicted example, power in the weakest channel ($S'_7$) drops from 7 dBm to 6.7 dBm. This defines a new baseline power level of 6.7 dBm. This is detected by the periodic monitoring of optical power in the system. Using the same the user selected power margin of 1 dBm, the power range is changed from 7–8 dBm to 6.7–7.7 dBm. The optical channels having optical power in excess of 7.7 dBm are controllably attenuated to bring the channels back into compliance with the user selected optical power margin, as shown in the example of FIG. 4(*c*). Alternatively, if the baseline power level remains stable, but some other channels increase in optical power to a level falling outside the user selected power margin the non-compliant channels are selectively attenuated until they fall within the user selected power range. In another situation, if the baseline power level remains stable, and the optical power in at least one other channel decreases to a level falling below the baseline power level, the new weakest channel defines a new baseline power level. As a result, the lower end of the user selected power range is changed. The other channels are selectively attenuated such that the optical power of all channels falls within the new user selected power range. In yet another situation, if the baseline power level increases, each of the channels is analyzed and weakest channel defines a new increased baseline power level that changes the lower end of the user selected power range. The other channels are selectively attenuated such that the optical power of all channels fall within the new user selected power margin. What is common to each of these situations is that the channel having the lowest optical power defines the baseline power level to which the user selected power margin is calibrated. And the optical channels are equalized at or above the baseline power level (that is to say selectively and controllably attenuated until the optical power of each channel falls within the user selected power range).

Referring again to FIG. 2, the optical cross-connect switch 100 includes a switch element 30 and optical detector elements 136, which are coupled to a control element 36. The switch element 30 is shown in greater detail in FIGS. 6 and 8. Optical channels are input into the switch element 30 through an array of input fiber optic cables ($S_1, S_2, \ldots, S_{n-1}, S_n$) 116. Additionally, the optical channels are output from the switch element 30 into an array of output fiber optic cables ($S_1', S_2', \ldots, S_{n-1}', S_n'$) 117.

Control circuitry of the control element 36 is coupled to the switch element 30. Such control circuitry 36 can comprise a wide range of devices or combinations of devices. In one embodiment the control element 36 includes digital signal processors ("DSP's") and memory which control the operation of the switch 30. Examples of satisfactory DSP's are TMS320C6211 digital signal processors manufactured by Texas Instruments of Dallas, Tex. The control element 36 controls MEMS reflectors (e.g., 112, 113 of FIG. 6) of switch element 30. The control element 36 receives optical power values from optical detector elements 136 (see FIG. 2), which are associated with switch embodiments of the present invention. One satisfactory optical power detecting element 136 is a fiber optic power splitter (e.g., a Model #9-107798-2 produced by AMP of Harrisburg, Pa.) and a photodetector element, such as a #ETX75 photodetector produced by Epitaxx of West Trenton, N.J. In the alternative, an integrated optical tap/photodetector could be used to accomplish both tasks, for example, a #IPD-10 produced by Santec of Japan. Optical power information received by the detector 136 is supplied to the control circuitry 36 where it is used to determine reflector orientation.

The control element 36 is able to generate mathematical approximations of the relationship between optical power versus MEMS reflector parameters (e.g., reflector position, voltage applied to reflector actuators, or other measurable and controllable parameters indicative of reflector orientation) based on optical power values, obtained by the detectors 136, and received by the control element 36. The control element 36 orients the MEMS reflectors of the switch 30 based on mathematical approximations of the relationship between optical power versus reflector position. The control element 36 accomplishes this, for example, by running code stored in memory.

The control circuitry of the control element 36 can include a processor which is also coupled to the switch 30. In one embodiment, a satisfactory processor is an MPC860 Power PC microprocessor supplied by Motorola, Inc. of Schaumburg, Ill. In conventional application the processor operates to maintain optimal signal paths through switch 30. In the present embodiments, the processor also enables the detuning of the reflectors in the switch 30 to selectively and controllably attenuate light beams in order to accomplish the optical power equalization discussed above.

Figure 6:
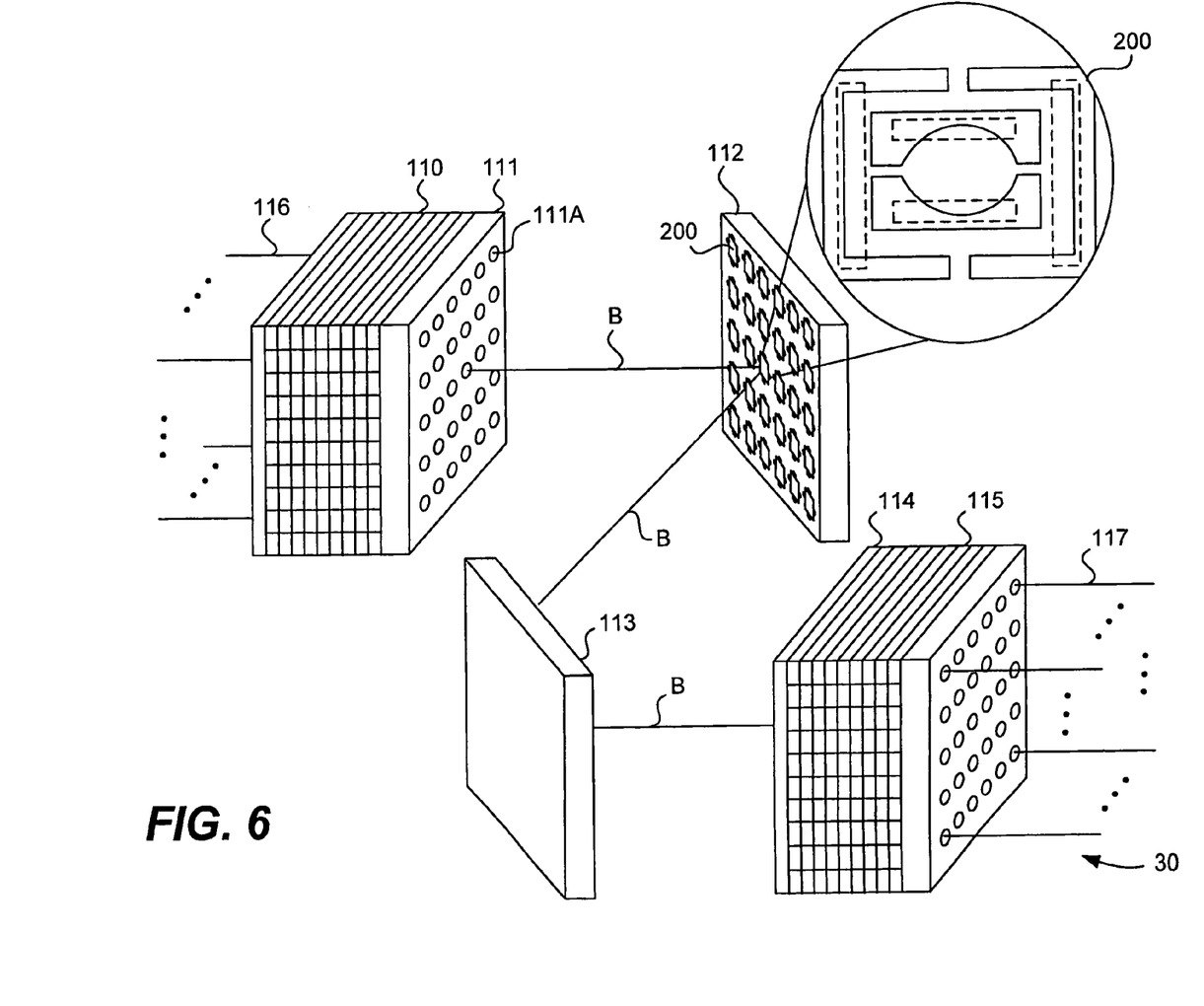
FIG. 6 is an illustration of a portion of an optical switch embodiment capable of practicing the principles of the present invention

FIG. 6 illustrates a switching element embodiment 30 which can be used in accordance with the principles of the present invention. The switching element 30 includes an input fiber block 110, into which a plurality of input optical fibers 116 are fitted and aligned with the lenses 111A of a lens array 111. The switching element 30 also includes an output fiber block 115, into which a plurality of output optical fibers 117 are fitted and aligned with the lenses of a lens array 114. These components direct input light beams onto a pair of mirror arrays (which are also referred to herein as movable mirror planes) 112, 113 where the light beams are directed to desired output optical fibers 117. Each of the mirror arrays 112, 113 has a plurality of electrically addressable mirror and frame assemblies (reflectors) 200. As previously discussed, the orientation of the reflectors 200 is controlled by the control element 36. An example of a reflector 200 is shown in the expanded view shown in FIG. 6 and in greater detail in FIG. 7.

Optical channels enter the switching element 30 through the input optical fibers 116 as light beams (for example, the single beam B being shown here). The light beams are passed through the input lens array 111, where in preferred implementation, the optical beams are collimated by the lenses 111A of the input lens array 111 before being introduced to the mirror arrays 112, 113 where they are reflected into the desired output optical fibers 117. Typically the light beams are collimated as they pass through the lenses of the output lens array 114 into the optical fibers 117 of an output fiber array 115 where the light beams B are passed on through the remainder of the optical transmission system (not shown).

By moving the reflectors 200 of the input mirror array 112 (first input mirror array) and the reflectors of output mirror array 113 (second input mirror array), light beams B from one input fiber may be switched from one fiber to another. Moreover, the reflectors can be oriented to maximize optical power in the beams B. Reflectors are typically, made up of a micro-electro-mechanical combination of mirror, frame, gimbels, and actuators. Such systems are referred to as micro-electro-mechanical systems (MEMS). These MEMS reflectors 200 can be constructed by a variety of means. One preferred example is set forth in U.S. patent application Ser. No. 09/471,796 entitled, "A Micromachined Reflective Arrangement" which is hereby incorporated by reference, for all purposes. Each mirror array includes a plurality of these MEMS reflectors 200.

Figure 7:
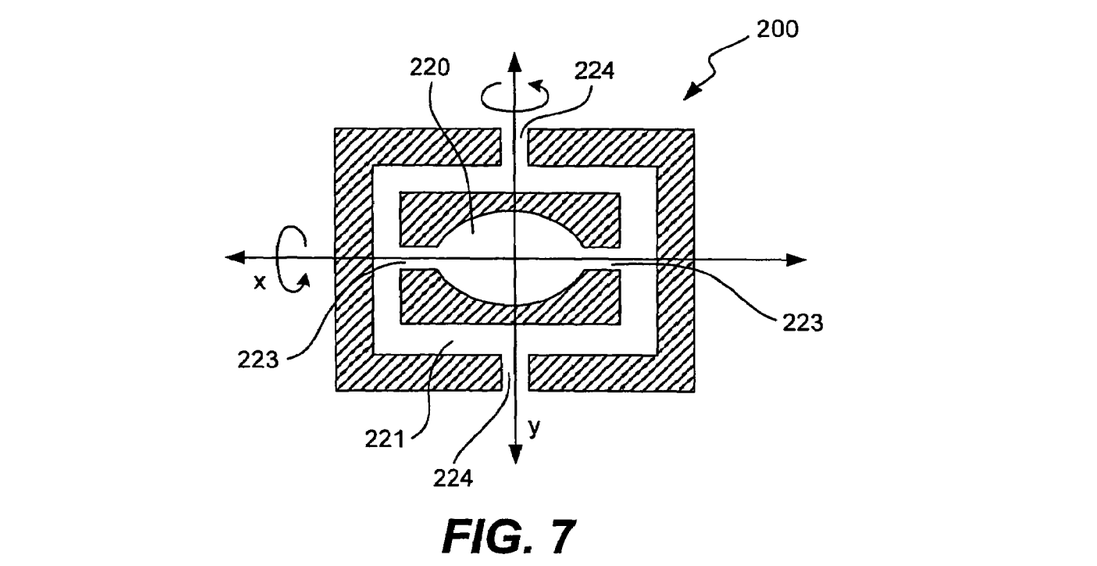
FIG. 7 is an illustration of a MEMS reflector embodiment that can be used in accordance with the principles of the present invention.

FIG. 7 depicts an example of a MEMS reflector assembly 200. Each MEMS reflector assembly 200 includes a mirror element 220 and a frame element 221. The mirror element 220 is rotatably suspended in the frame element 221 by gimbels 223. And the frame element 221 is rotatably suspended in a mirror array (e.g., 112, 113) by gimbels 224. Each MEMS reflector 200 can be rotated about two axes (shown here as being rotated by the mirror gimbels 223 about an x-axis and by the frame gimbels 224 about a y-axis). Such rotation alters the optical path of beams reflected by the reflectors 200. Although the mirrors 220 depicted here are generally elliptical in shape, there is no requirement that they be so. Moreover, although the axes about which the reflectors rotate are depicted as orthogonal to each other, there is no requirement that they be so.

Figure 8:
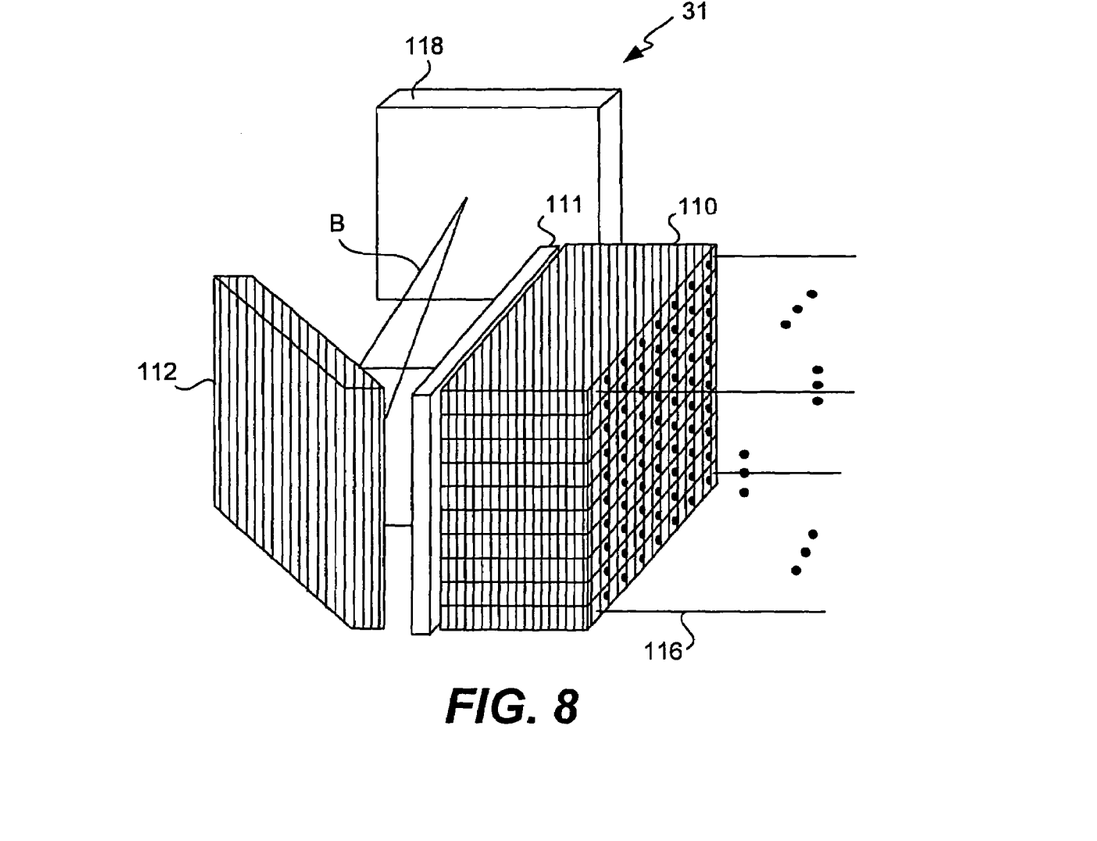
FIG. 8 is an illustration of a portion of another optical switch embodiment capable of optical power balancing in accordance with the principles of the present invention

FIG. 8 illustrates another embodiment of an optical cross-connect switch 31 which can be used to achieve power balancing in a group of optical signals. Here, a single array of input fiber optic cables 116 is introduced to a block 110 and lens array 111. Only a single mirror array 112 is required due to the presence of a fixed mirror 118, which directs the optical beams B back to the mirror array 112, back through the lens array 111, and back into the "input" fiber array 110. In this embodiment, the fiber array 110 operates as both an input and output fiber array. The embodiment shown in FIG. 8 has the advantage of allowing light that passes through any fiber to be switched to any other fiber in the fiber array 116. The embodiment shown in FIG. 8 can also be used to practice the principles of the present invention. Additionally, although the invention is explained with reference to the embodiments of FIGS. 6 and 8 (i.e., embodiments having a single mirror array 112 or two mirror arrays 112 and 113), the inventors contemplate that the present invention can be practiced using alternative embodiments having any number of mirror arrays.

Figure 9A:
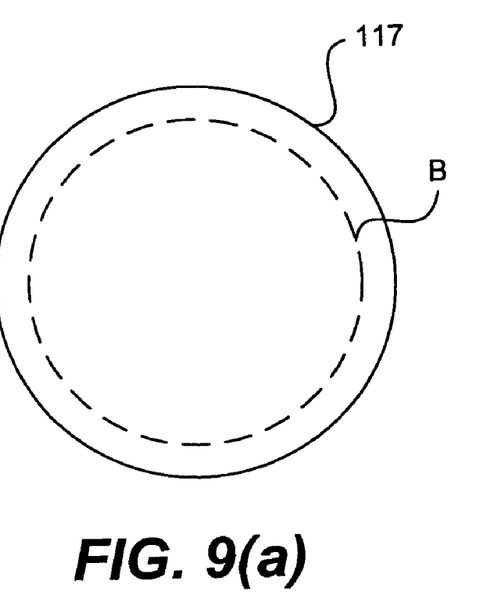
FIGS. 9A–9B are end-on views of optical fibers and optical beams which illustrate aspects of beam misalignment.
Figure 9B:
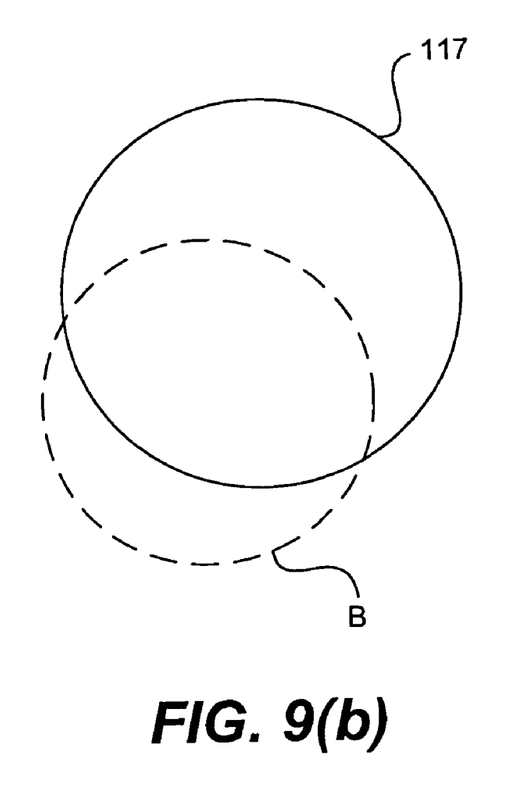

In order to explain certain aspects of the present invention reference is made to FIGS. 9A and 9B. The need to selectively attenuate optical power in selected optical channels has already been explained. By attenuating an optical beam as it passes through an optical switch, selective attenuation of optical power in an optical channel may be achieved. The following discussion will help illustrate aspects of such attenuation. FIG. 9A is an edge-on depiction of an unattenuated optical beam B and a corresponding optical fiber 117. In conventional implementation, the unattenuated beam B is reflected by the reflectors of a switch such that maximum optical power is transmitted and the beam B is positioned to enter the output fiber in a substantially centered manner. FIG. 9B shows a beam B which has been attenuated in accordance with an embodiment of the present invention. The beam is offset with respect to the corresponding optical fiber 117. This offset is in response to the detuning of reflectors in the optical switch. The degree of such detuning determines the amount of attenuation of the optical beam B.

As previously stated, in order to achieve a power distribution in a group of optical channels which falls within a user selected power margin, selected channels are controllably attenuated to equalize optical power in the group of optical channels. Preferred embodiments achieve this by intentionally misaligning selected optical beams such that the optical paths of the beams do not perfectly align to the intended output fibers of the output fiber array. Such misalignment attenuates optical power in selected beams and the degree of attenuation depends on the amount of signal loss required to achieve a more balanced optical power distribution in the optical channels.

Referring again to the block diagram of FIG. 2, attenuation is accomplished by detuning the reflectors in the switch 30. The control element 36, analyzing information provided by the optical detectors 136, controllably and selectively "detunes" the reflectors to achieve attenuation in selected optical channels. When reflectors are oriented such that maximum beam power is produced, the reflectors are said to be "tuned". In the described embodiments, the operation of the control circuitry and actuator elements which orient the reflectors (e.g., electrostatic actuators) are altered from their normal tuned orientation. Instead, selected reflectors are detuned, thereby reducing the optical power transmitted by those beams. The embodiments of the present invention balance optical power in a plurality of optical signals (e.g., a group of optical channels) by increasing optical path loss in the stronger channels to provide signal balancing across the many channels of a group of optical channels.

Figure 10:
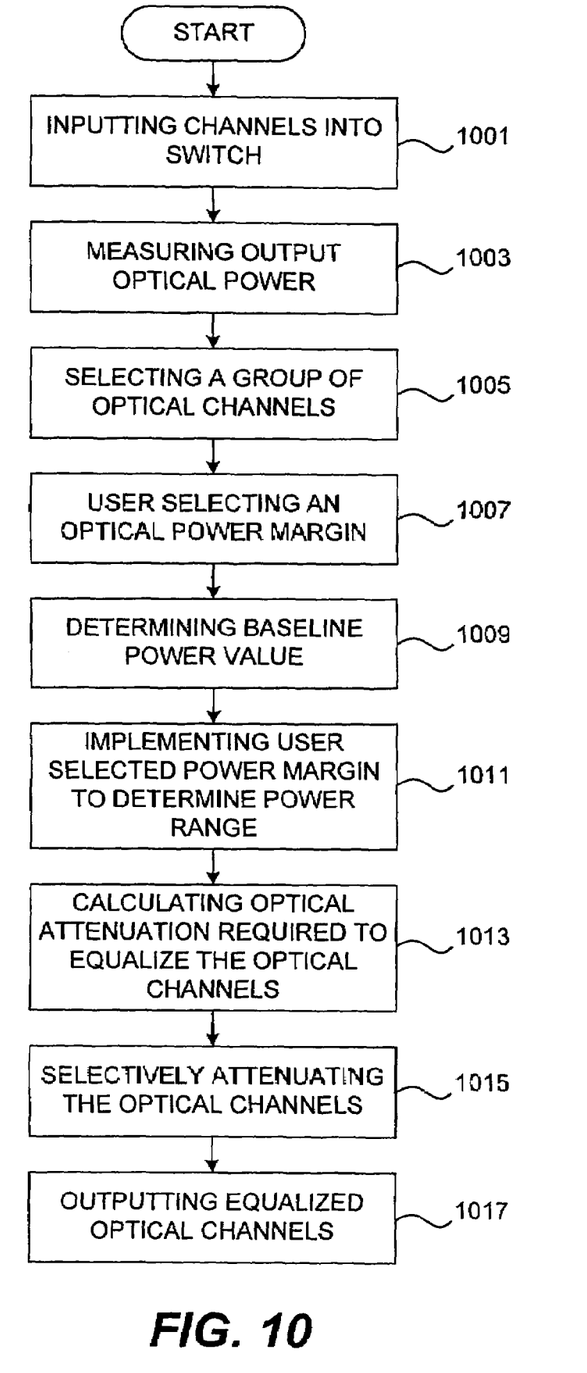
FIG. 10 is a flowchart describing a suitable method embodiment for accomplishing optical signal balancing in an optical transmission system in accordance with the principles of the present invention.

FIG. 10 is a flowchart illustrating a method embodiment 1000 for operating optical cross-connects (switches) in an optical transmission system in a manner that achieves equalized power distribution among a group of optical channels such that the optical power of each optical channel falls within a user selected power range. The method 1000 begins by inputting a plurality of optical channels into an optical switch (Step 1001). These optical channels are typically comprised of optical signals output from the fibers of the optical transmission system. Such optical signals can be digital data signals, audio signals, video signals, or any other optically transmittable signal known to those having ordinary skill in the art. Such signals can be transmitted using ISDN, WDM, DWDM, or other optical data transmission modes. Examples of preferred switches are shown in FIGS. 6 and 8.

The optical power in each of the optical channels is detected and measured (Step 1003). In one embodiment the optical power is detected and measured by an optical power detecting element 136 (See, FIG. 2) as it is output from the switch element. Such detecting and measuring is an ongoing process conducted at periodic intervals.

A group of optical channels is selected by the user (Step 1005). Such selection is typically in response to some predetermined criteria. For example, the criteria can be that each channel in the group of channels must include only working beams and test beams can be selected out. Alternatively, all optical channels passing through the switch can be selected as the group of optical channels. The optical power margin is also selected (Step 1007). For example, an optical power margin of 1.0 dBm can be selected.

The measured values for optical power in each channel of the group of optical channels is used to determine the baseline power value for a group of optical channels (Step 1009)(e.g., the lowest optical power in a group of optical channels). Once a baseline power value is determined, the user selected power margin is used to determine a user selected power range (Step 1011). The purpose of the user selected power margin is to allow the user to define the equalization tolerance of the system by selecting a power margin (e.g., 1 dBm). Moreover, the user selected power range allows the user to define the power range into which the optical power of each optical channel in a group of optical channels must fall. The degree of attenuation required in each optical channel to bring that optical channel to a power level which falls within the user selected power margin is then calculated (Step 1013). In one embodiment, such determinations and calculations are performed by the control element (e.g., 36, FIG. 2). Based on the measured optical power of the optical channels and a determination of the user defined power range the amount of attenuation required for each optical channel can be determined. Once the desired amount of attenuation is determined for each optical channel, each channel is attenuated as needed to fall within the user selected power margin (Step 1015). Typically, the attenuation is accomplished by iteratively adjusting the reflector positions until a beam of desired power is achieved. Alternatively, the reflectors are iteratively adjusted until a relationship between optical power and reflector position can be determined, at which point the reflectors are adjusted such that the desired power is achieved in the beam. The attenuated and equalized group of optical channels is output from the switch (Step 1017). As a result, the optical power in each optical channel is such that the group of optical channels has a more uniform power distribution.

In a simplified example, an input group of optical channels having power values of 10 dBm, 7 dBm, 6 dBm, and 4 dBm, respectively, are measured at an optical switch. The weakest channel has an optical power level of 4 dBm. Thus, the baseline power level is determined as 4 dBm. If the user selected power margin is 1 dBm then the desired power range is 4–5 dBm. The group of optical channels will be selectively attenuated and output as a group of optical channels having a more uniform power distribution (i.e., power values between 4 dBm and 5 dBm). For example, the 10 dBm, 7 dBm, and 6 dBm optical channels are attenuated until their optical power values fall within the 4 dBm to 5 dBm range. Continuing the example, the attenuation of the 10 dBm, 7 dBm, and 6 dBm optical channels is determined to be −5 dB to −6 dB, −2 dB to −3 dB, and −1 dB to −2 dB respectively. The described embodiments attenuate selected optical signals by the controlled detuning of reflectors. The details of such attenuation are described in greater detail hereinbelow. The now equalized group of optical signals are output from the switch and can be transmitted elsewhere in the optical transmission system.

A Preferred Method for Achieving Controlled Loss of Optical Power in an Optical Beam Implementations of the invention use controlled detuning of the reflectors in an optical switch to selectively attenuate a group of optical beams in order to achieve a more uniform distribution of optical power in the group of optical beams. A preferred method embodiment for achieving optical beam attenuation is disclosed hereinbelow. It should be noted that other methods can be used for controlling optical signal attenuation. Moreover, such methods can be varied depending on the optical switch configuration used.

Referring, for example, to the embodiment of FIG. 6, the reflectors 200 are oriented to optimize beam intensity. The optimal reflector orientations can be stored in a look-up table which forms part of the control circuitry 36. However, because such optical systems are dynamic, this information is constantly changing and is constantly updated using information from the optical detectors 136. A suitable method and apparatus for dynamically managing this optimal beam intensity is set forth in U.S. patent application Ser. No. 09/586,711, filed on Jun. 5, 2000, entitled "Positioning a Movable Reflector in an Optical Switch". The forgoing patent application is hereby incorporated by reference.

From this optimal orientation the selected reflectors are deliberately detuned to reduce optical beam intensity. The attenuation method embodiment disclosed herein performs calculations which will generate an appropriate degree of attenuation in each selected fiber. Moreover, the method may be applied to each reflector in the optical path of the selected beam, but advantageously, need only be applied to one reflector in the optical path.

Figure 11:
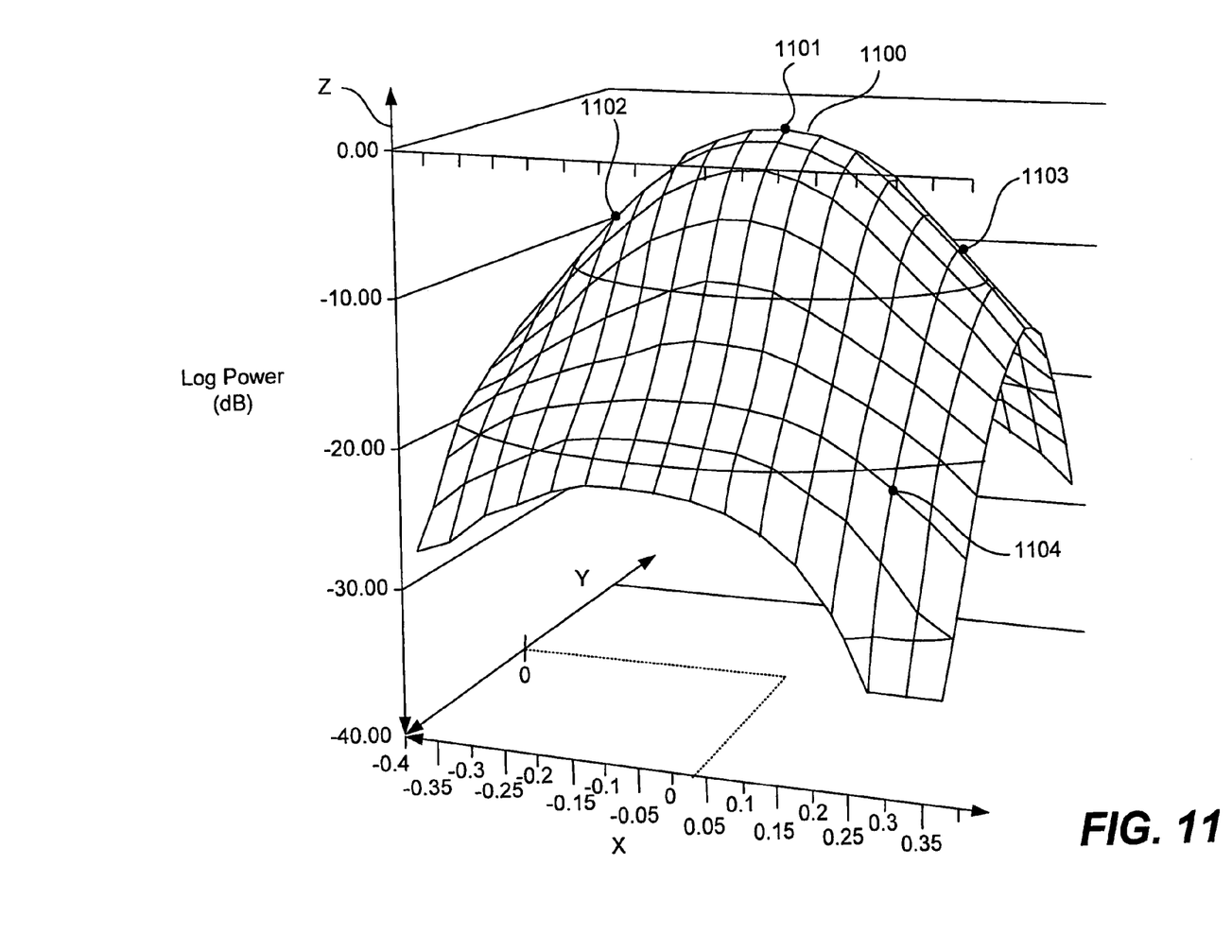
FIG. 11 is a three-dimensional graphical depiction of a power profile in an optical channel with optical power being plotted on the vertical axis versus reflector control parameters on the horizontal axes.

The graph of FIG. 11 depicts a 3-D optical power profile 1100 in an optical channel. In an optical switch the optical power of an optical beam can be depicted as a three-dimensional curve 1100 with the magnitude of optical power on one axis (shown here as the log of optical power along the Z-axis), and reflector parameters or beam position on the other two axes (the X- and Y-axes). The reflector parameters can include a wide range of variables. For example the X- and Y-axes can refer to an optical beam position on an output fiber. In the depicted example, the beam power is maximized (shown by point 1101) when the beam is centered in the output fiber. As can be seen from the graph, if the beam drifts from the optimal position, beam optical power is reduced.

Alternatively, the power profile 1100 can be a graph of beam optical power versus reflector parameters. Such reflector parameters can include, but are not limited to, the physical orientation or position of the reflector (e.g., the angle of the reflector) or the voltage applied to the actuators that move and position the reflectors. In applying the principles to the graph of FIG. 11, for example, the X-axis can represent the angle of deflection of a reflector about one axis. And, the Y-axis can represent the angle of deflection of a reflector about another axis. The power profile peak (at point 1101) will be at the reflector angles which reflect the maximum amount of power into the output fiber. In another embodiment, the X-axis can represent the amount of voltage applied to an actuator that moves the reflector about one axis. And, the Y-axis can represent the amount of voltage applied to an actuator moving the reflector about another axis. The peak power value $P_{max}$ (at point 1101 on the graph) will be at the actuator voltages which position the reflectors such that a maximum amount of beam optical power enters the output fiber. In switch embodiments having both input reflectors and output reflectors for each beam, a power profile can be formed for each input reflector and each output reflector. Either, or both of these power profiles can be used to attenuate the optical beam in accordance with the principles of the present invention.

The depicted power profile 1100 approximates a Gaussian curve. Point 1100 represents peak or optimum optical power curve $P_{max}$ in the channel. When the optical power in an output channel is at $P_{max}$ the reflector (or combination of reflectors) are at the best or optimal orientation for transmitting a light beam at maximum power (i.e., the reflector(s) are "tuned"). Optical power at other, less optimal example reflector orientations 1102, 1103, 1104 are also shown for comparison. Optical power falls off as the reflector orientation is detuned from the optimal orientation.

It can be seen that the optical channels can be attenuated by applying controlled detuning of the reflectors with respect to either the X- or Y-axes. In one embodiment, a combination of both the input reflectors and the output reflectors are used to attenuate the optical beam. For example, one reflector is tuned to reflect maximum optical power in the beam and the other reflector is used to attenuate the beam. The power profiles 1100 can illustrate this, for example, the beam is adjusted (by moving the reflectors) such that the power values represented by a first power profile 1100 remain at a maximum power value. Additionally, the beam is adjusted (by moving the reflectors) such that the power values represented by a second power profile remain at the peak (optimized) power value in one axis (e.g., the X-axis) while the power is attenuated by detuning the reflectors in the other axis. In this way the optical power in the optical beams can be controllably attenuated by selectively detuning reflectors. For example, the reflectors at the input reflector can be oriented to optimize beam power and the output reflectors can be selectively detuned by optimizing the output reflector position in one axis but detuning the output reflector in the other axis. Other approaches are possible but it is frequently simplest to detune only one reflector in one dimension while keeping the other reflector dimensions in an optimized orientation.

The following discussion integrates, the above process into the general process of achieving an equalized power distribution in a group of optical signals (as in Steps 1001–1017 of FIG. 10). Once the optical power in each signal in a group of optical signals is measured (Step 1003) and the user selected power range is determined (Steps 1007–1011), then the required degree of optical power attenuation for each optical channel is determined (Step 1013). Such a calculation determines the required power $P_{req}$ for each channel so that each channel falls within the user selected power range.

Once the required power $P_{req}$ for each beam in a group of beams is determined, and the degree of attenuation required to achieve the required power $P_{req}$ is determined, the beams are attenuated (Step 1015). One suitable method for attenuating the optical power in an optical beam is detailed hereinbelow. Each optical beam subject to attenuation is moved through a "dither" pattern. Each beam is dithered (moved in small distances) about a start position to obtain a series of power readings which are used to attenuate the beam.

Figure 12:
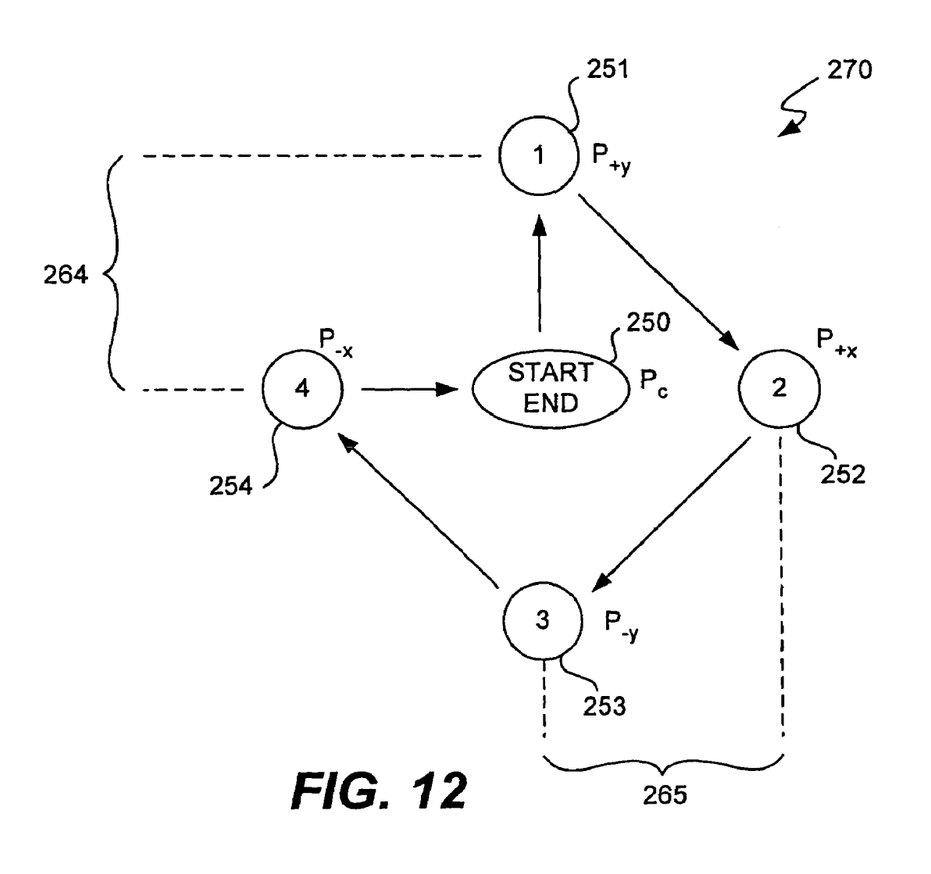
FIG. 12 is a illustration describing a suitable dither pattern capable of use in detuning reflectors to attenuate an optical signal (beam) in accordance with the principles of the present invention.

FIG. 12 shows an example of one suitable dither pattern. The optimally focused beam starts at position 250. Beam power $P_0$ at position 250 is measured taken using detector (136 of FIG. 2). The beam is dithered about the start point 250 in a dither pattern 270, which includes dither points 250 through 254. The beam is dithered to the four surrounding positions 251, 252, 253, and 254 where power measurements $P_{+y}$, $P_{+x}$, $P_{-y}$, and $P_{-x}$ are made. For increased accuracy many power readings can be taken at each point 250–254 and their resultant values integrated. For example, 100 or 1000 separate measurements can be taken. These values are integrated and averaged to provide accurate power measurements.

One procedure for moving a beam through a dither pattern is described. The beam begins at the start point 250, power $P_0$ is measured here. A reflector is detuned such that the beam moves an initial dither distance 264 in the positive y-direction to a point 251 where a power reading $P_{+y}$ is made. The reflector is then detuned such that the beam moves a dither distance in the y-direction and a dither distance in the x-direction 265 to point 252 where another power reading $P_{+x}$ is made. Again, the reflector is detuned such that the beam moves a dither distance in the x-direction and a dither distance in the y-direction to position 253 where another power reading $P_{-y}$ is made. Again, the beam is dithered or moved in the x- and y-directions to a point 254 where another power reading $P_{-x}$ is made. The initial dither distance which the optical beams are dithered in the x- and y-directions (264, 265) can be on the order of the physical dimensions of the mirror arrays and the reflectors contained therein. For example, a dither movement on the order of $\frac{1}{10}^{th}$ of a mirror width is a suitable initial dither distance.

Figure 13A:
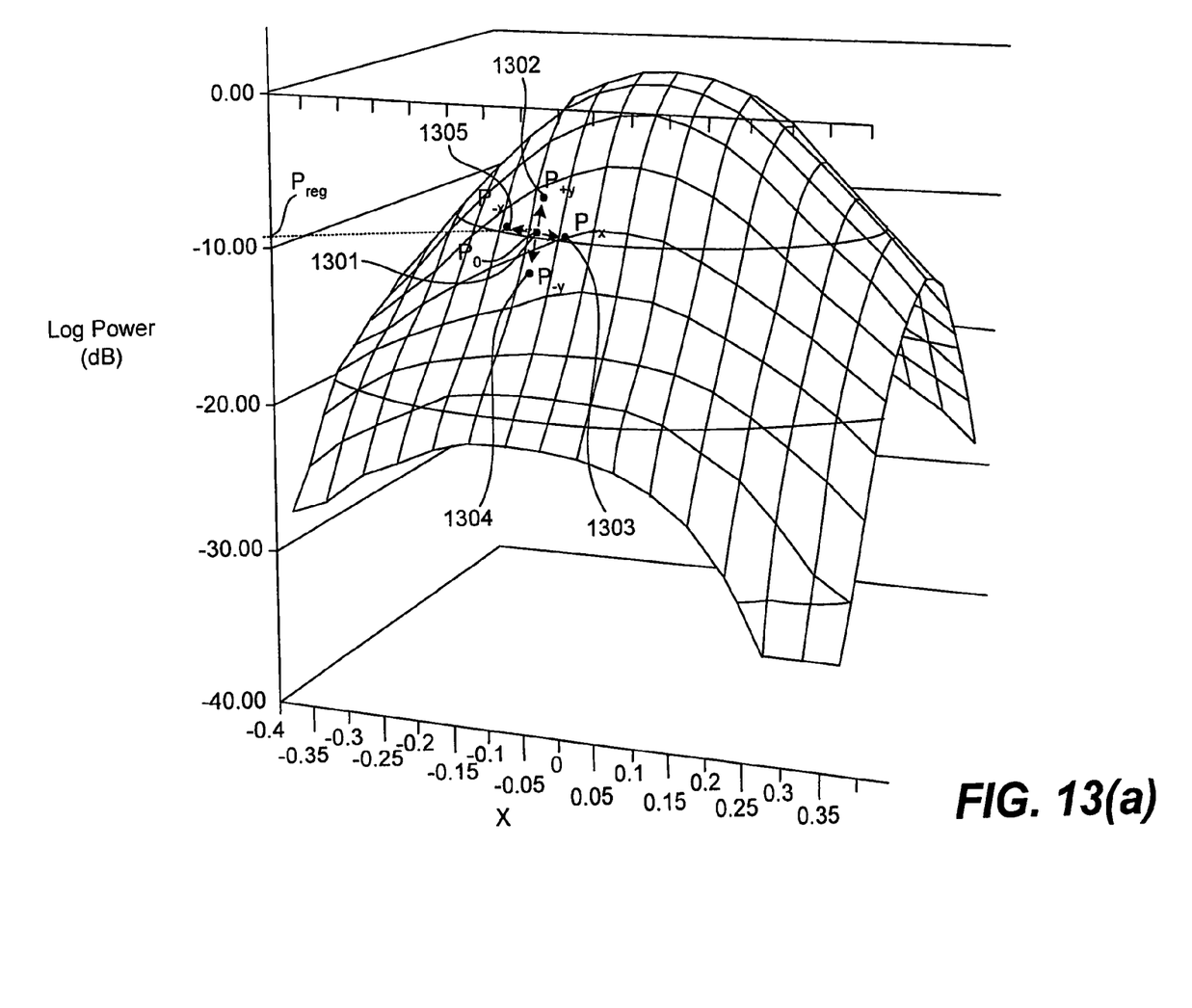
FIG. 13(a) shows a 3-D power profile in an optical channel graphically depicting the effects of dither on optical power when an optical beam is detuned in accordance with the principles of the present invention.

FIG. 13 shows a power profile similar to that of FIG. 11. A beam is shown having an initial power $P_0$ (i.e., the power reading taken at optimized beam position 250 of FIG. 12) at point 1301. The beam is dithered to dither point 251 (of FIG. 12) and the power value $P_{+y}$ is measured. The $P_{+y}$ is graphed (at point 1302) with respect to the change in position in the +Y direction. The power value $P_{+x}$ is graphed (at point 1303) with respect to dither point 252. The power value $P_{-y}$ is graphed (at point 1304) with respect to dither point 253, and finally, the power value $P_{-x}$ is graphed (at point 1305) with respect to point 254.

As indicated above, although the x and y axes of FIG. 13 are depicted as physical distances, such axes can refer to other measurable and controllable parameters related to reflector detuning, for example, positive and negative voltages applied to the actuators controlling the reflector orientation. In such a case, the optical power profiles graph optical power versus x and y actuator voltages.

As has already been indicated, the optical beam is controllably moved through the dither pattern by the control circuitry 36. Referring to the embodiment of FIG. 6, either the output reflectors 113 or the input reflectors 112 or both the output reflectors 113 and the input reflectors 112 can be moved to implement the dither pattern. For the sake of simplicity, the following discussion refers to a preferred embodiment which implements the dither pattern using the only the reflectors of the output mirror array 113. As this is being accomplished, the control circuitry 36 is receiving optical power information from the optical detector 136 for positions 250 through 254.

Figure 13B:
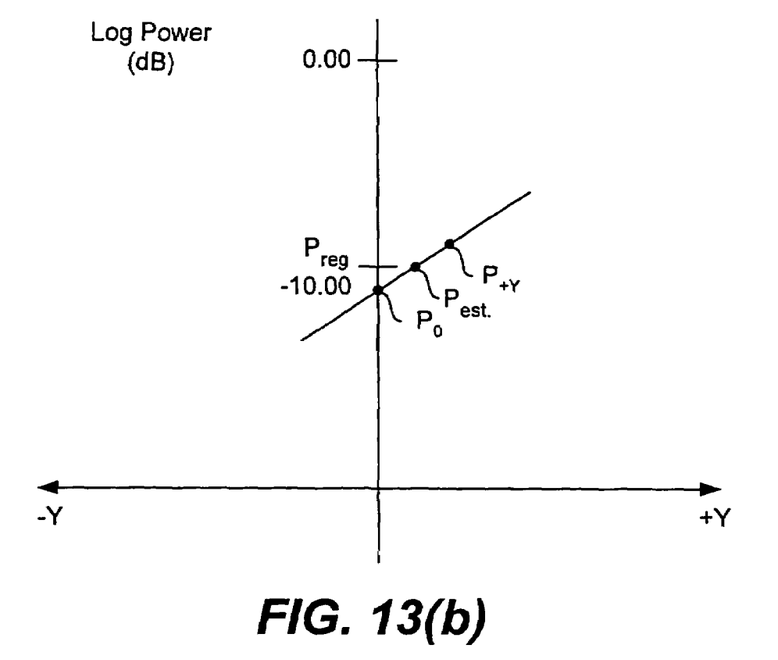
FIG. 13(b) is a two dimensional depiction of a portion of the graph of FIG. 13(a) showing the dither effect in accordance with the principles of the present invention.

Once the power values (e.g., $P_0$, $P_y$, $P_x$, $P_{-y}$, $P_{-x}$) are obtained for each dither point, they are evaluated to determine the degree of reflector detuning needed to attenuate each beam. Referring to FIG. 13(a), it can be seen that $P_{req}$ lies on the power profile curve between $P_0$ (shown as point 1301 of FIG. 13(a)) and $P_{+y}$ (shown as point 1302 of FIG. 13(a)). The beam can be dithered with respect to the Y-axis to obtain a plot of power values versus position in the Y-axis. An example of such a two dimensional plot is shown in FIG. 13(b). Based on this information, a new position can be calculated such that the beam has a power value at or near $P_{req}$. This estimated power value $P_{est}$ can be used as a basis for a new dither pattern wherein the beam is dithered a smaller distance and the calculations are used to obtain a more accurate position. In this way beams can be adjusted until the beam power is $P_{req}$ and the beam is successfully attenuated. The beam is accurately attenuated using such iterative processes. Methods like linear interpolation or other more accurate estimation methods can be used to more accurately model beam power versus reflector position behavior. This process is repeated for each optical channel needing attenuation until each channel achieves an optical power that falls within the user selected power range.

In one embodiment, the reflectors 200 of both the input array and the output array can be detuned in the x- and y-directions to achieve attenuation. This presents a sophisticated four-dimensional problem. Alternatively, either the input reflectors or the output reflectors can be detuned to attenuate the beam. This simplifies the problem by detuned only a single reflector in the x- and y-axes to create a two-dimensional problem.

In other so-called two-D switch embodiments (also sometimes referred to as digital or ON/OFF switches) the optical beam is attenuated by detuning only one reflector. Such two-D embodiments are discussed in detail in "Electrostatic Micro Torsion Mirrors for an Optical Switch Matrix" (Journal of Microelectromechanical Systems, Vol 5, No. 4, December 1996), which is hereby incorporated by reference. Advantageously, in such embodiments, the reflector need be detuned in only one axis (e.g., the x-axis). This eliminates many of the complexities inherent in trying to successfully attenuate the beam in two axes simultaneously.

Figure 14:
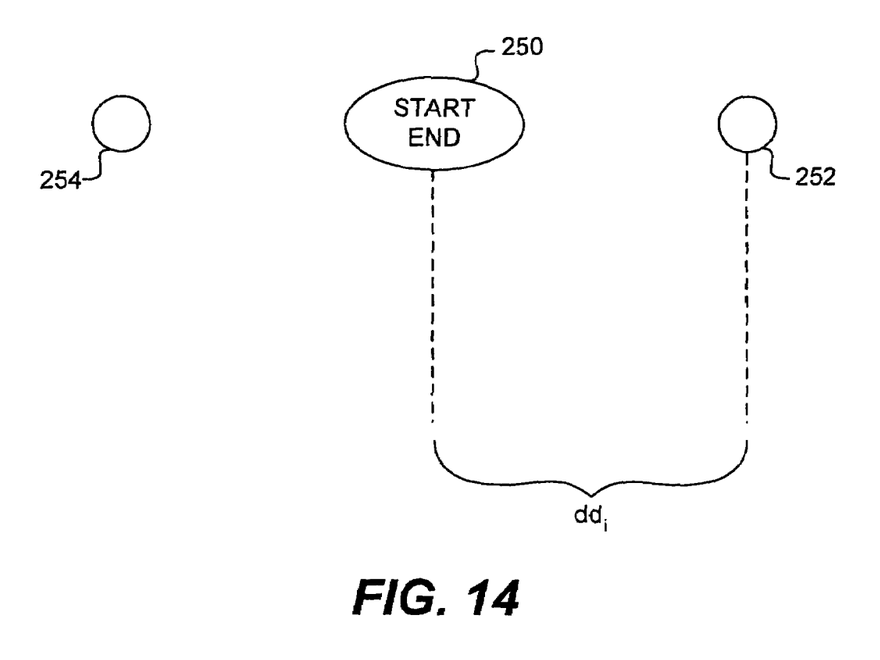
FIG. 14 is a depicts a simplified single axis dither pattern capable of use in detuning reflectors to attenuate an optical signal (beam) in accordance with the principles of the present invention.

FIG. 14 illustrates a single axis (here the x-axis) dither pattern. An initial power value $P_0$ is determined at the start point 250. The reflector is detuned to dither the beam in the positive x-direction to dither point 252 which lies some initial dither distance $dd_i$ away from the start point 250. An example of a suitable initial dither distance dd; is again $\frac{1}{10}^{th}$ of a mirror width. Once the beam is dithered to dither point 252, a power reading $P_{+x}$ is taken. The beam can be dithered a distance in the negative x-direction toward point 254 (e.g., to a point -$dd_i$ from the start 250) where a power reading of $P_{-x}$ is obtained. In a manner similar to that previously discussed the beam can be attenuated to $P_{req}$. Again, the procedure is repeated for each channel needing attenuation.

The present invention has been particularly shown and described with respect to certain preferred embodiments and specific features thereof. However, it should be readily apparent to those of ordinary skill in the art that various changes and modifications in form and detail may be made without departing from the spirit and scope of the invention as set forth in the appended claims. In particular, it is contemplated by the inventors that the principles of the present invention can be practiced with optical switch embodiments having one, two, three, and more movable mirror planes. Further, reference in the claims to an element in the singular is not intended to mean "one and only one" unless explicitly stated, but rather, "one or more". Furthermore, the examples provided herein are intended to be illustrative rather than limiting. The inventions illustratively disclosed herein can be practiced without any element which is not specifically disclosed herein.

We claim:

1. A fiber optic switching device enabling the switching of optical signals and the selective attenuation of optical signals, the device comprising:
   an input fiber array;
   an output fiber array;
   an optical switch that includes at least one reflector array configured such that a light beam input into the switch from the input fiber array can be reflected by the at least one reflector array into a desired output fiber in the output fiber array as an output beam and configured so that adjustments to the at least one reflector array selectively attenuate the optical power of the light beam until output beam attains a desired optical power level;
   a control element that facilitates switching of the light beam from the input fiber array to the desired output fiber and facilitates the selective attenuation of output beam until it attains a desired optical power level; and
   a detector for measuring the optical power of the cutout beam and outputting an associated signal that is received by the control element which uses the signal to determine the amount of attenuation required in the output beam so that it can attain the desired optical power level.

2. The fiber optic switching device of claim 1 wherein the input fiber array and the output fiber array comprises a single fiber array.

3. The fiber optic switching device of claim 1 wherein the at least one reflector array selectively attenuates the optical power of the tight beam by detuning at least one of the reflectors of the at least one reflector array until the output beam attains a desired optical power level.

4. The fiber optic switching device of claim 3 wherein the detuning of the at least one of the reflectors attenuates the optical power of said output beam by sub-optimally coupling the output beam to an output fiber of the output fiber array.

5. The fiber optic switching device of claim 1 wherein the device is configured such that optical signals input by the input fiber array into the optical switch are selectively attenuated by the optical switch so that a more uniform power distribution is achieved among the optical signals.

6. The fiber optic switching device of claim 5 wherein the detector comprises a monitor element for monitoring the optical power of the optical signals; and
   wherein the control element includes circuitry for determining the optical power of the weakest signal of the optical signals, thereby defining a baseline optical power level, wherein the circuitry implements a user selected power margin in combination with the baseline optical power level to define a user selected power range, and
   wherein the circuitry selectively attenuates the optical power of optical signals that fall outside the user selected power range such that the signal power of each optical signal falls within the user selected power range.

7. The fiber optic switching device of claim 1 wherein the control element is configured to facilitate output beam attenuation using dithering to obtain selective attenuation of the output beam to obtain the desired optical power level.

* * * * *

UNITED STATES PATENT AND TRADEMARK OFFICE
CERTIFICATE OF CORRECTION

| | | |
|---|---|---|
| PATENT NO. | : 7,142,744 B2 | Page 1 of 1 |
| APPLICATION NO. | : 11/067030 | |
| DATED | : November 28, 2006 | |
| INVENTOR(S) | : Walter et al. | |

It is certified that error appears in the above-identified patent and that said Letters Patent is hereby corrected as shown below:

In the Claims:

In line 18 of claim 1 (column 15, line 19) change "cutout" to --output--.

In line 3 of claim 3 (column 15, line 30) change "tight beam" to --light beam--.

Signed and Sealed this

Third Day of July, 2007

JON W. DUDAS
*Director of the United States Patent and Trademark Office*